United States Patent [19]

Inaguma

[11] Patent Number: 5,313,517
[45] Date of Patent: May 17, 1994

[54] AUTOMATIC BUSY MESSAGE SENDING SYSTEM FOR TELEPHONE COMMUNICATION

[75] Inventor: Teruaki Inaguma, Tokyo, Japan

[73] Assignee: NEC Corporation, Tokyo, Japan

[21] Appl. No.: 896,863

[22] Filed: Jun. 12, 1992

[30] Foreign Application Priority Data

Jun. 12, 1991 [JP] Japan .................................. 3-139374

[51] Int. Cl.⁵ .............................................. H04M 3/42
[52] U.S. Cl. .................................... 379/67; 379/212; 379/201; 379/209
[58] Field of Search ............... 379/67, 87, 265, 266, 379/201, 209, 208, 309, 84, 88, 134, 135

[56] References Cited

U.S. PATENT DOCUMENTS

| | | | |
|---|---|---|---|
| 4,078,158 | 3/1978 | Houée | 179/27 |
| 4,788,715 | 11/1988 | Lee | 379/84 |
| 4,932,042 | 6/1990 | Baral et al. | 379/67 |
| 5,020,095 | 5/1991 | Morganstein | 379/67 |
| 5,060,258 | 10/1991 | Turner | 379/134 |
| 5,166,974 | 11/1992 | Morganstein | 379/67 |
| 5,185,780 | 2/1993 | Leggett | 379/34 |
| 5,185,782 | 2/1993 | Srinivasan | 379/67 |

Primary Examiner—James L. Dwyer
Assistant Examiner—Michael Lau
Attorney, Agent, or Firm—Sughrue, Mion, Zinn, Macpeak & Seas

[57] ABSTRACT

An automatic busy message sending system for use in telephone communication to inform the calling subscriber, when the called subscriber's line is busy, of the duration of the busy status by voice. As the calling subscriber can receive, when the called subscriber's line is busy, a busy status message corresponding to the duration of the called subscriber's busy status instead of a busy tone, the calling subscriber can more accurately anticipate the ending time of the called subscriber's communication, and thereby minimize the repetition of the call initiating procedure. This service can be realized without having to add extra equipment to the electronic switching system currently in operation.

3 Claims, 5 Drawing Sheets

| BUSY STAT. DURATION | CHANNEL NUMBER | BUSY MESSAGE |
|---|---|---|
| IDLE | 0 | — |
| 00'00"– 00'59" | 1 | THIS LINE BECAME BUSY JUST NOW |
| 01'00"– 01'59" | 2 | THIS LINE HAS BEEN BUSY FOR OVER 1 MINUTE |
| 02'00"– 02'59" | 3 | THIS LINE HAS BEEN BUSY FOR OVER 2 MINUTES |
| 03'00"– 03'59" | 4 | THIS LINE HAS BEEN BUSY FOR OVER 3 MINUTES |
| ⋮ | ⋮ | ⋮ |
| OVER– 14'00" | 15 | THIS LINE HAS BEEN BUSY FOR OVER 14 MINUTES |

FIG. 6
| LAST LOOK MEMORY | LINE MEMORY | STATUS CHANGE OF TELEPHONE SET |
|---|---|---|
| 0 | 0 | (IDLE) |
| 0 | 1 | CHANGE TO OFF HOOK |
| 1 | 0 | CHANGE TO RELEASE |
| 1 | 1 | (BUSY) |
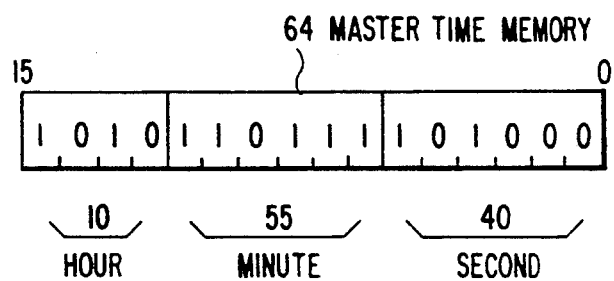
FIG. 7
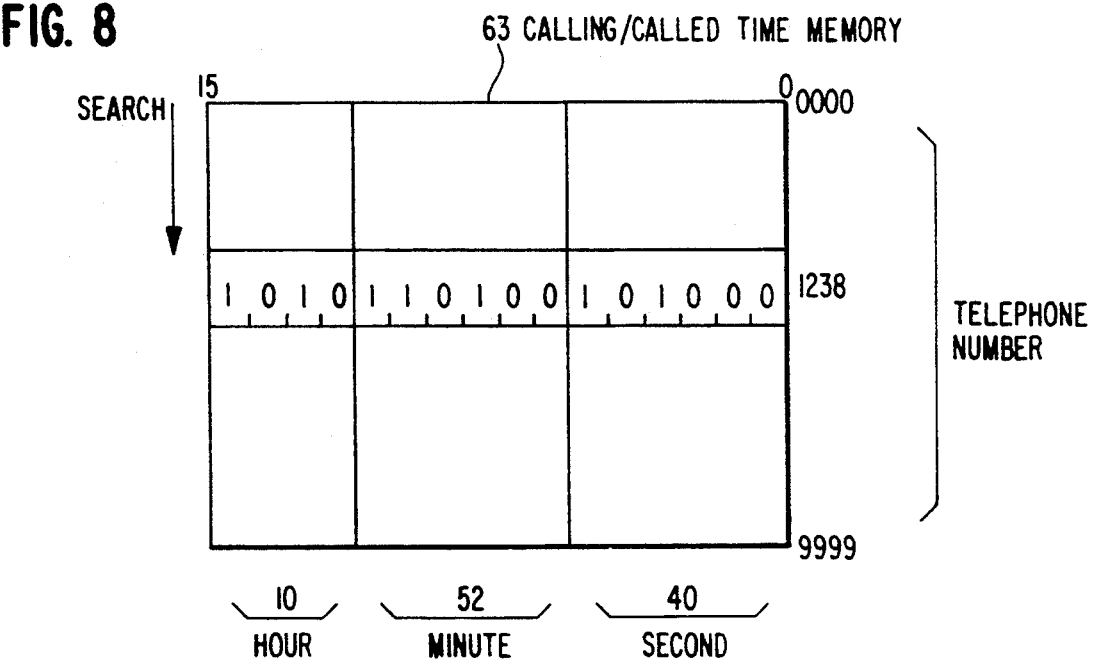
FIG. 8

FIG. 9

| BUSY STAT. DURATION | CHANNEL NUMBER | BUSY MESSAGE |
|---|---|---|
| IDLE | 0 | — |
| 00'00"–00'59" | 1 | THIS LINE BECAME BUSY JUST NOW |
| 01'00"–01'59" | 2 | THIS LINE HAS BEEN BUSY FOR OVER 1 MINUTE |
| 02'00"–02'59" | 3 | THIS LINE HAS BEEN BUSY FOR OVER 2 MINUTES |
| 03'00"–03'59" | 4 | THIS LINE HAS BEEN BUSY FOR OVER 3 MINUTES |
| ⋮ | ⋮ | ⋮ |
| OVER–14'00" | 15 | THIS LINE HAS BEEN BUSY FOR OVER 14 MINUTES |

AUTOMATIC BUSY MESSAGE SENDING SYSTEM FOR TELEPHONE COMMUNICATION

BACKGROUND OF THE INVENTION

1. Field of the Invention

The present invention relates to a telephone switching system, and more particularly to an electronic telephone switching system capable of automatically transmitting, when a calling subscriber encounters any destination that is busy, a voice message indicating the length of time from the beginning of that busy status till the current point of time, i.e. the duration of the busy status, instead of a busy tone to the calling subscriber.

2. Description of the Prior Art

A telephone switching system, upon receiving dial number information from a calling subscriber, identifies the telephone number of the destination, sends out a ringing signal to the telephone set of the destination, and sends back a ring back tone to the calling subscriber. When the subscriber at the destination takes up the handset of his telephone, the switching system detects the off-hook status, stops sending the ringing signal and the ring back tone, and operates a communication path switch to connect, and to keep connected, the calling and the called subscribers.

Meanwhile, if the called subscriber is communicating with another subscriber when a call is initiated by said calling subscriber, the switching system will send out a busy tone to the calling subscriber. The calling subscriber knows by this busy tone that the destination of his call is busy, and puts his handset on the hook, in response to which the switching system is released.

In order for the calling subscriber to achieve connection with his desired destination, he should repeat the call initiating procedure some time after he puts his handset on the hook. If the destination is still busy, he should repeat the procedure until the connection is finally achieved.

To dispense with this troublesome repetition of the call initiating procedure, an electronic messaging service is proposed in the U.S. Pat. No. 4,932,042, "Spontaneous Voice and Data Messaging". The service thereby provided is to send an announcement signal regarding the availability of a messaging service, either simultaneously with or instead of a busy tone, to the calling subscriber. A calling subscriber wishing to use this messaging service dials a prescribed three-digit number. Upon detection of this three-digit number by the switching system, the calling subscriber is connected to a voice message operation center (VMOC), which is supplied by the switching system with the telephone numbers of the calling and called subscribers and billing information.

Meanwhile, in order to verify the telephone number of the destination of the message, the VMOC sends an announcement signal to the calling subscriber. As the calling subscriber responds to that signal by operating a dial key, the VMOC receives and records a voice message from the calling subscriber. Upon completion of the reception and recording of this voice message, call initiation to convey that message is accomplished by the prior art.

The use of this messaging service would require the payment of a subscription fee for this service in addition to the usual fixed monthly due for subscription to the telephone system, because the installation and operation of said VMOC costs a large sum of money. The collection of this additional fee is preventing the messaging service according to said patented invention from being used more extensively.

BRIEF SUMMARY OF THE INVENTION

Object of the Invention

An object of the present invention, therefore, is to provide a telephone switching system which makes possible a busy messaging service to dispense with many repetitions of the call initiating procedure by the calling subscriber without requiring expensive additional equipment.

Another object of the invention is to provide a telephone switching system which makes possible this kind of busy messaging service requiring the collection of no additional toll and accordingly available to all the telephone subscribers.

Summary of the Invention

According to the invention, there is provided an electronic switching system having a service function to announce the duration of a busy status, involving:

many subscriber telephone sets;

line circuits for respectively conducting these subscriber telephone sets to a switching means;

the switching means, to which these line circuits are connected, for selectively forming a communication path, under the control of a central processing unit, between the telephone set of a calling subscriber and the telephone set of a called subscriber designated as desired with a dial signal from the telephone set of the calling subscriber; and supplying means for supplying a busy signal representing busy status, when the telephone set of said called subscriber is busy, to the telephone set of said calling subscriber;

the electronic switching system further involving:

detecting means for detecting, in cooperation with said line circuits, the beginning and the end of the off-hook status of each of said subscriber telephone sets;

standard time means for generating a time signal;

memory means for memorizing the beginning time of said off-hook status based on said time signal;

calculating means for calculating, when a dial signal corresponding to the telephone number of said subscriber telephone set in said off-hook state has been received, the duration of the busy status from the beginning of said off-hook status till said reception of said dial signal on the basis of said time signal and the output of said memory means; and voice message signal generating means responsive to the output of said calculating means for generating a voice message signal corresponding to said busy status duration and supplying the voice message signal to said supplying means.

The invention enables the calling subscriber to receive, when the called subscriber's line is busy, a voice message corresponding to the busy status duration instead of a usual busy tone, and accordingly to choose more easily the best timing for initiating a call again, resulting in a significant reduction in the trouble of repeating the call initiating procedure.

The function to be added to the telephone switching system according to the invention can be realized without imposing any extra burden on the inherent memory equipment and voice announcement signal sending equipment of the switching system, and therefore the voice messaging service according to the invention can be offered to subscribers with no additional charge.

BRIEF DESCRIPTION OF THE DRAWINGS

The above-mentioned and other objects, features and advantages of the present invention will become more apparent from the following detailed description when taken in conjunction with the accompanying drawings, wherein:

FIG. 6 is a diagram depicting correspondence between the stored contents of said memory means and different statuses of the subscriber's telephone;

FIGS. 7 and 8 are diagrams illustrating the mode of the storage of time information in another part of said memory means; and FIG. 9 is a diagram depicting correspondence between the duration of communication and the busy status duration announcing message in the above-mentioned preferred embodiment.

DETAILED DESCRIPTION OF THE PREFERRED EMBODIMENT

Figure 1:
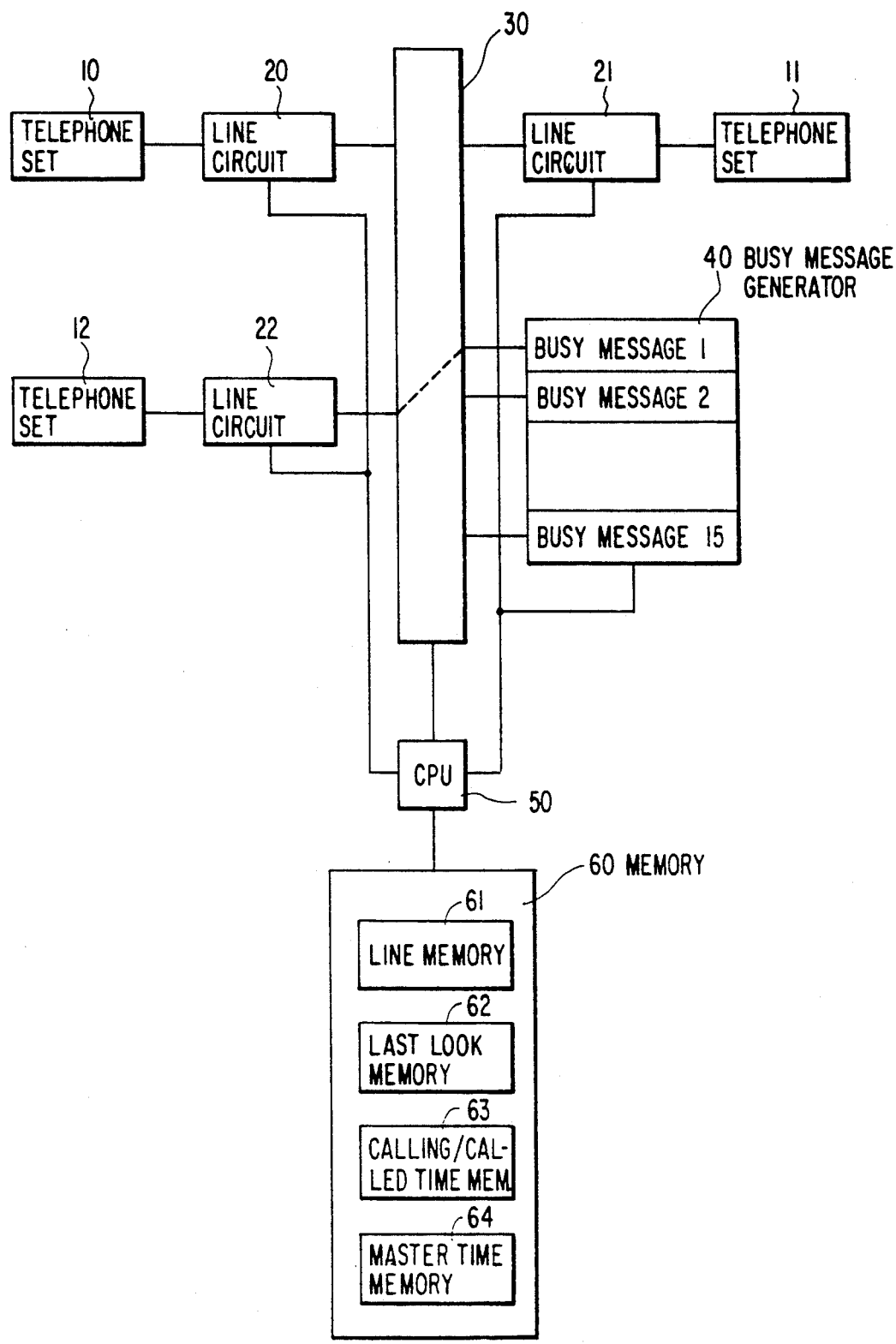
FIG. 1 is a block diagram of a preferred embodiment of the invention.

Referring to FIG. 1, a preferred embodiment of the present invention is provided with line circuits 20, 21, 22, . . . , inserted between telephone sets 10, 11, 12, . . . (only three sets in plural telephone sets are shown), respectively, and a communication path switch 30, for detecting the status of each of these telephone sets, such as call initiation, response or release; a central processing unit (CPU) 50; an external memory unit 60 connected to this CPU 50; and a busy message generator 40 for announcing the busy status duration. The external memory unit 60 is equipped with a line memory 61 for storing the respective statuses of the telephone sets, detected by the line circuits 20, 21, 22, . . . , by scanning these line circuits in each scanning period; a last look memory 62 for storing the respective statuses of said telephone sets 10, 11, 12, . . . , one scanning period before their statuses stored in the line memory 61; a calling/called time memory 63 for storing the respective time points at which the telephone sets 10, 11, 12, . . . , call or are called; and a master time memory 64 for storing the current time point while updating it with the lapse of time. The busy message generator 40 generates signals for announcing the time length, for instance by the minute, physically in parallel, and selectively supplies the signals to the telephone sets 10, 11, 12, . . . , through the communication path switch 30. This busy message generator 40 can also store said busy status duration announcing signals converted into time-division multiplexed PCM signals for the purpose of said parallel supply. The CPU 50 calculates the time difference between the read outputs of said master time memory 64 and calling/called time memory 63, i.e. the duration of the called subscriber's busy status, selects one of the plurality of voice outputs of said busy message generator 40 as the voice signal corresponding to that busy status duration, and uses it as said voice signal.

Figure 3:
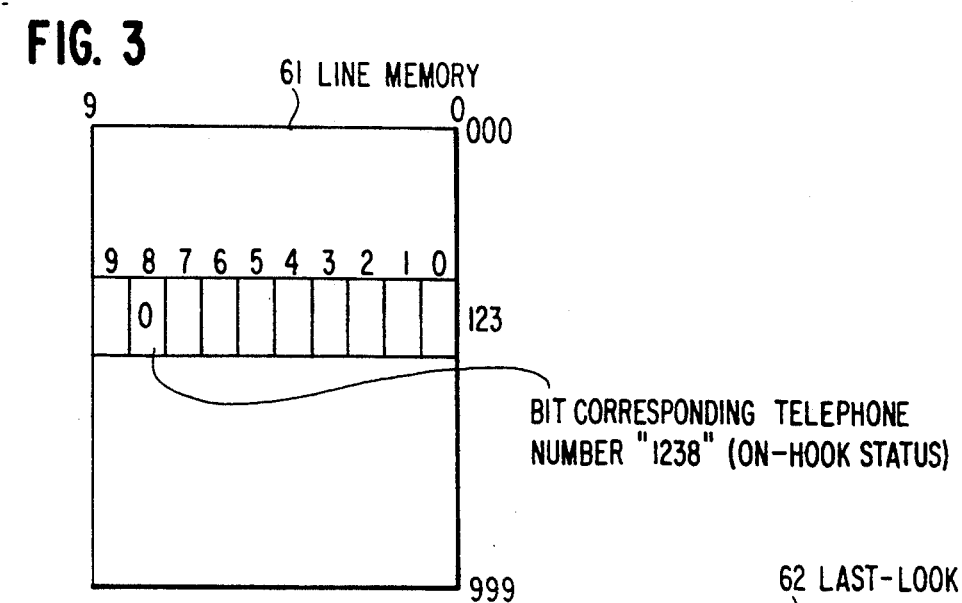
FIGS. 3, 4 and 5 are schematic diagrams illustrating some details of the memory means in the preferred embodiment shown in FIG. 1.
Figure 4:
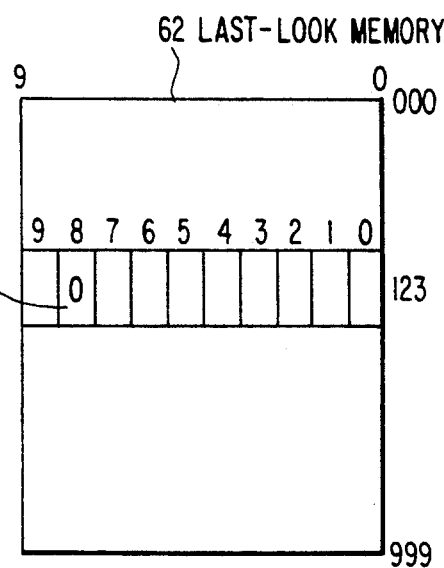

Each of the line memory 61 and the last look memory 62 allocates one bit for each of the said statuses of each of the telephone sets 10, 11, 12, . . . , and records the statuses by having, for example, the calling/called status (i.e. the off-hook status) represented by "1" and the initial/released status (i.e. the on-hook status) by "0". Each of these memories 61 and 62 has a memory area of 10 bits in the direction of rows by 1000 rows in the direction of columns, and said "0" or "1" is stored in the applicable position of each memory area. If commercially available 16-bit memories are used as these line memory 61 and last look memory 62, their six most significant bits will be left blank. This arrangement facilitates the search of the memory areas with the subscriber numbers of the telephone sets 10, 11, 12, . . . , used as keys. For instance, the retrieval of the bit corresponding to a telephone number "1238" can be accomplished by identifying the 123rd row by the first three digits and the 8th bit position by the remaining one digit (FIGS. 3 and 4).

Figure 5:
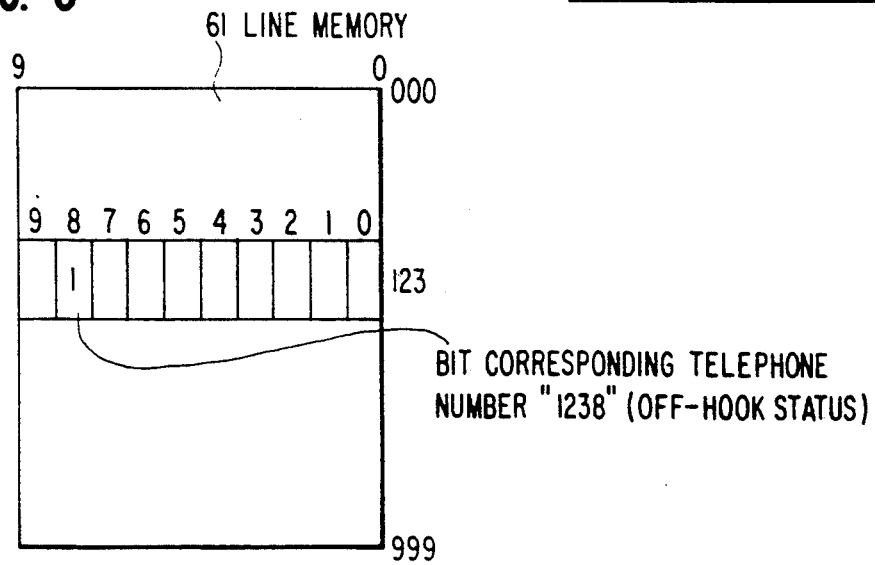

If the periodic scanning (in 8 milli-second periods, for example) of the telephone circuits 20, 21, 22, . . . , by the CPU 50, i.e. the sending of probe pulses and the reception of status indicating signals in response to that, detects a status change of the same telephone number "1238" to off the hook, above-described one bit "0" will change to "1" (FIG. 5). So that the occurrence of the change can be detected, the stored contents of the line memory 61 is transferred as it is to the last look memory 62 before its periodic scanning. Thus, the stored contents of the line memory 61 is updated every 8 milli-seconds, and the last look memory 62 stores the status of the stored contents of the line memory 61 one period before.

The CPU 50 detects any status change in the telephone sets 10, 11, 12, . . . , by comparing the stored contents of the line memory 61 and the last look memory 62 (FIG. 6).

The master time memory 64, as shown in FIG. 7, has a storage capacity of 16 bits, and stores the current time point. FIG. 7 illustrates the binary representation of 10 : 55'40''. The CPU 50 reads the standard time datum generated by a standard time apparatus (not shown), and stores it into the master time memory 64.

The calling/called time memory 63 is intended for storing the busy status duration of each of the telephone sets 10, 11, 12, . . . , and, as shown in FIG. 8, has a 1 byte memory area for each telephone set. Its binary time representation is the same as that of the master time memory 64 illustrated in FIG. 7.

The busy message generator 40, as shown in FIG. 9, is provided with a ROM storing 15 kinds of digitized voice messages indicating the duration from 0 minute to over 14 minutes at 1 minute graduations. These voice messages are constantly supplied in parallel to a terminal of the communication path switch 30.

Figure 2:
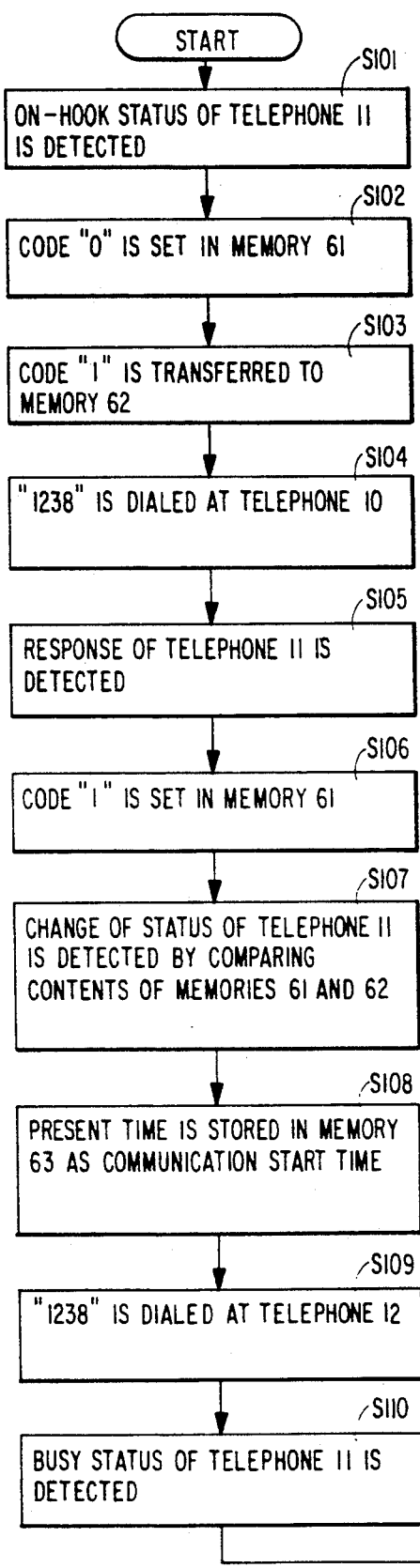
FIG. 2 is a flow chart for describing the operation of this preferred embodiment.
Figure 2:
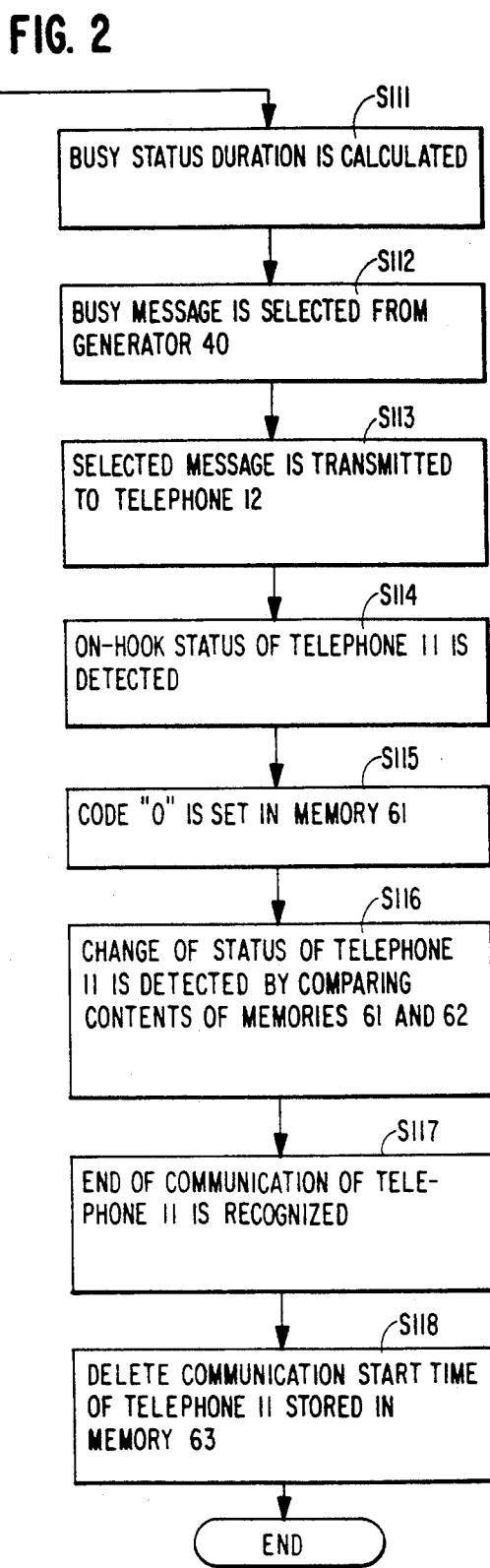

Next will be described the operation of the preferred embodiment of the invention with reference to FIG. 2 together. For the purpose of this description it is supposed that the telephone sets 10 and 11 are busy and call initiation is attempted from the telephone set 12 with the telephone set 11 as the destination.

When the line circuit 21 detects the on-hook status of the telephone set 11 (step S101 in FIG. 2), a code "0" is set in the 8th bit position of the address 123 (FIG. 3) of the line memory 61 (step S102). The contents of the line memory 61 is transferred to the last look memory 62 before the lapse of 8 milli-seconds, which is the scanning period for line circuits (step S103).

When the subscriber number "1238" of the telephone set 11 is dialed at the telephone set 10 in this status (step S104), the telephone set 11 responds. The line circuit 21 detects the response of the telephone set 11 (step S105).

Further, the line circuit 21 is scanned within the lapse of 8 milli-seconds, and a code "1" indicating the response of the telephone set 11 (which is off the hook) is set in the 8th bit position of the address 123 (FIG. 5) of the line memory 61 (step S106).

The 8th bit positions of the address 123 in the line memory 61 and the last look memory 62 are compared. As the bit corresponding to the telephone set 11, which was "0" in the last look memory 62, has changed to "1" in the line memory 61 (FIG. 5), the response by the telephone set 11 is detected (step S107) (FIG. 6). The code "1" in the line memory 61 is transferred to the last look memory 62 before the next scanning (8 milli-seconds later).

Upon detection of the response by the telephone set 11 (step S107), the stored content (i.e. standard time datum) of the master time memory 64 is read out. The calling/called time memory 63 (FIG. 8) is searched with the subscriber number "1238" corresponding to the telephone set 11 as the retrieval key, and the read output from the master time memory 64 is stored into the address "1238" (step S108). At this time, the telephone sets 10 and 11 are connected by the communication path switch 30, and the two telephone sets are thereby placed in a communicating status.

Next, the telephone set 12 turns into the off-hook state, and the subscriber number "1238" of the telephone set 11 is dialed (step S109). The busy status of the telephone set 11 is detected by comparing the stored contents of the line memory 61 and the last look memory 62 (step S110). Then the busy status duration of the telephone set 11 is calculated from the current time datum stored in the master time memory 64 and the communication start time datum in the calling/called time memory 63 (step S111). The message corresponding to this calculated duration, out of the plurality of outputs of the busy message generator 40 (step S112), is supplied to the telephone set 12 via the communication path switch 30 (step S113). This causes the telephone set 12 to receive a voice message indicating the busy status duration of the telephone set 11 (saying, for instance, "This line has been busy for over three minutes."). Based on this message, the user of the telephone set 12 initiates a call after the lapse of what he considers an appropriate length of time, and achieves connection to the telephone set 11.

Upon completion of the communication between the telephone sets 10 and 11, the line circuit 21 detects on-hook operation of the telephone set 11 (step S114), and the result of this detection is recognized by the CPU 50 as the difference between the stored contents of the line memory 61 and the last look memory 62 as stated above. When the on-hook status of the telephone set 11 is continued while predetermined time, the end of communication by the telephone set 11 is perceived (steps S115 to S117). Then the CPU 50, responding to the perception of the end of communication by the telephone set 11, detects the communication start time of the telephone set 11 stored in the calling/called time memory 63 (step S118) to stand by for the next call initiation or incoming call.

In the preferred embodiment described above, the combination of the standard time apparatus (not shown) and the master time memory 64 for specifying the time points of status changes of the telephone sets can be replaced, as required, with a combination of a clock pulse source, a pulse counter and a memory. The busy message generator 40 can also be a recording/reproducing device for analog voice signals themselves.

As hitherto described, the telephone switching system according to the present invention can announce, when the called subscriber's line is busy, the duration of that busy status in a voice message to enable the calling subscriber to more accurately anticipate the ending time of the called subscriber's communication according to that message and to avoid trying to call that subscriber again in vain. The message service according to the invention can be realized without substantially adding extra equipment to the essential constituent elements of the switching system, and therefore can be provided with no additional charge.

Although the invention has been described with reference to a specific embodiment, this description is not meant to be construed in a limiting sense. Various modifications of the disclosed embodiment, as well as other embodiments of the invention, will become apparent to persons skilled in the art upon reference to the description of the invention. It is therefore contemplated that the appended claims will cover any such modifications or embodiments as fall within the true scope of the invention.

What is claimed is:

1. An electronic switching system comprising:
   a plurality of subscriber telephone sets;
   a switching means;
   line circuits for respectively connecting said subscriber telephone sets to said switching means;
   a central processing unit for controlling said switching means to selectively form a communication path between the telephone set of a calling subscriber and the telephone set of a called subscriber designated as desired with a dial signal from the telephone set of the calling subscriber;
   a supplying means for supplying a busy signal representing busy status, when the telephone set of said called subscriber is busy, to the telephone set of said calling subscriber;
   detecting means for detecting, in cooperation with said line circuits, a beginning and an end of an off-hook status of each of said subscriber telephone sets;
   a pulsing means for allowing said detecting means to supply probe pulses with a predetermined period to said line circuits;
   a first memory for storing status indicating signals supplied from each of said line circuits in response to said probe pulses;
   a second memory to which the stored contents of said first memory is transferred before said period has lapsed;
   means for comparing the stored contents of said first and second memories;
   standard time means for generating a time signal;
   memory means for memorizing a beginning time of said off-hook status based on said time signal;
   calculating means for calculating, when a dial signal corresponding to the telephone number of said subscriber telephone set in said off-hook status has been received, the duration of the busy status from the beginning of said off-hook status until said dial signal was received, said calculation performed on the basis of said time signal and the output of said memory means; and voice message signal generating means responsive to the output of said calculating means for generating a voice message signal corresponding to said duration of the busy status and supplying said voice message signal to said supplying means.

2. An electronic switching system, as claimed in claim 1, wherein said voice message signal generating means is provided with digital memory means for storing said voice message signals in digital form, and converting means for converting the output of said storing means into analog signals.

3. An electronic switching system, as claimed in claim 1, wherein said duration of the busy status are specified in lengths having predetermined differences between each other in a finite number of steps, each of said voice message signals corresponds to one of said finite number of steps, and said voice message signal generating means is provided with means responsive to the output of said calculating means for selecting one of said voice message signals.

* * * * *